(12) United States Patent
Sugishita et al.

(10) Patent No.: US 12,139,190 B2
(45) Date of Patent: Nov. 12, 2024

(54) STEERING DEVICE

(71) Applicant: NSK LTD., Tokyo (JP)

(72) Inventors: Suguru Sugishita, Gunma (JP);
Hirotaka Shimizu, Gunma (JP);
Kouhei Takeishi, Gunma (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 18/275,515

(22) PCT Filed: Feb. 2, 2022

(86) PCT No.: PCT/JP2022/003986
§ 371 (c)(1),
(2) Date: Aug. 2, 2023

(87) PCT Pub. No.: WO2022/168849
PCT Pub. Date: Aug. 11, 2022

(65) Prior Publication Data
US 2024/0109580 A1    Apr. 4, 2024

(30) Foreign Application Priority Data
Feb. 4, 2021    (JP) .................. 2021-016328

(51) Int. Cl.
*B62D 1/20*    (2006.01)

(52) U.S. Cl.
CPC ..................... *B62D 1/20* (2013.01)

(58) Field of Classification Search
CPC ......... B62D 1/20; B62D 1/189; B62D 5/0409
See application file for complete search history.

(56) References Cited

U.S. PATENT DOCUMENTS

| 8,833,507 B2* | 9/2014 | Sekikawa | B62D 5/0409 |
| | | | 180/443 |
| 9,233,709 B2* | 1/2016 | Ishii | B62D 5/0403 |
| 11,173,950 B2* | 11/2021 | Kim | F16H 57/039 |

(Continued)

FOREIGN PATENT DOCUMENTS

| JP | 2002-81420 A | 3/2002 |
| JP | 2004-136749 A | 5/2004 |

(Continued)

OTHER PUBLICATIONS

International Search Report for PCT/JP2022/003986, dated Apr. 5, 2022.

*Primary Examiner* — James A English
*Assistant Examiner* — Shams Dhanani
(74) *Attorney, Agent, or Firm* — Sughrue Mion, PLLC

(57) ABSTRACT

A steering device includes: a steering shaft which extends along a central axis and to which a steering wheel is coupled on one side in an axial direction; a tubular steering column which is disposed on an outer circumferential side of the steering shaft and extends in the axial direction; and a gearbox which is disposed on the other side in the axial direction of the steering column and is fixed to the steering column. The steering column includes a fixing member provided at an end on the other side in the axial direction and fixed to the gearbox, and an outer circumferential surface on one side in the axial direction of the fixing member has an outer diameter which increases toward the other side in the axial direction.

4 Claims, 14 Drawing Sheets

(56) References Cited

U.S. PATENT DOCUMENTS

| | | | |
|---|---|---|---|
| 11,788,585 B2* | 10/2023 | Sato | F16J 15/3232 |
| | | | 192/45.004 |
| 2003/0110584 A1 | 6/2003 | Clare et al. | |
| 2004/0182637 A1* | 9/2004 | Yamamori | B62D 5/0409 |
| | | | 180/421 |
| 2005/0235768 A1* | 10/2005 | Shimizu | B62D 5/0409 |
| | | | 74/425 |
| 2009/0107756 A1* | 4/2009 | Miyoshi | H02K 29/12 |
| | | | 180/444 |
| 2009/0260914 A1* | 10/2009 | Streng | B62D 5/0403 |
| | | | 180/444 |
| 2009/0266640 A1* | 10/2009 | Oshima | B62D 5/0403 |
| | | | 180/444 |
| 2011/0240399 A1* | 10/2011 | Suzuki | F16D 3/68 |
| | | | 180/444 |
| 2012/0272765 A1* | 11/2012 | Fuechsel | F16C 35/045 |
| | | | 74/416 |
| 2015/0069745 A1* | 3/2015 | Iwakawa | B62D 1/185 |
| | | | 280/775 |
| 2017/0175821 A1* | 6/2017 | Segawa | B62D 5/0409 |
| 2018/0194387 A1* | 7/2018 | Kwon | B62D 5/0409 |
| 2018/0259061 A1* | 9/2018 | Rey | F16H 57/0464 |
| 2018/0297514 A1 | 10/2018 | Massonnaud et al. | |
| 2018/0312189 A1* | 11/2018 | Geiger | F16C 11/045 |
| 2019/0226571 A1* | 7/2019 | Appleyard | F16C 19/36 |
| 2020/0039575 A1* | 2/2020 | Doornbos | F16D 3/54 |
| 2020/0047789 A1* | 2/2020 | Yoshida | B62D 1/20 |
| 2020/0094866 A1* | 3/2020 | Kurokawa | B62D 1/185 |
| 2020/0283064 A1* | 9/2020 | Boyle | B62D 5/008 |
| 2020/0339180 A1* | 10/2020 | Buys | B62D 1/195 |
| 2021/0139072 A1* | 5/2021 | Segawa | F16D 3/54 |
| 2021/0293319 A1* | 9/2021 | Cheon | B62D 5/0409 |
| 2024/0059344 A1* | 2/2024 | Morishima | B62D 1/195 |

FOREIGN PATENT DOCUMENTS

| | | | |
|---|---|---|---|
| JP | 2005-502415 A | | 1/2005 |
| JP | 2013-035486 A | | 2/2013 |
| JP | 2011174791 | * | 2/2013 |
| JP | 6402617 B2 | | 10/2018 |
| WO | 2008/146664 A1 | | 12/2008 |
| WO | 2017/072032 A1 | | 5/2017 |

* cited by examiner

FIG.7
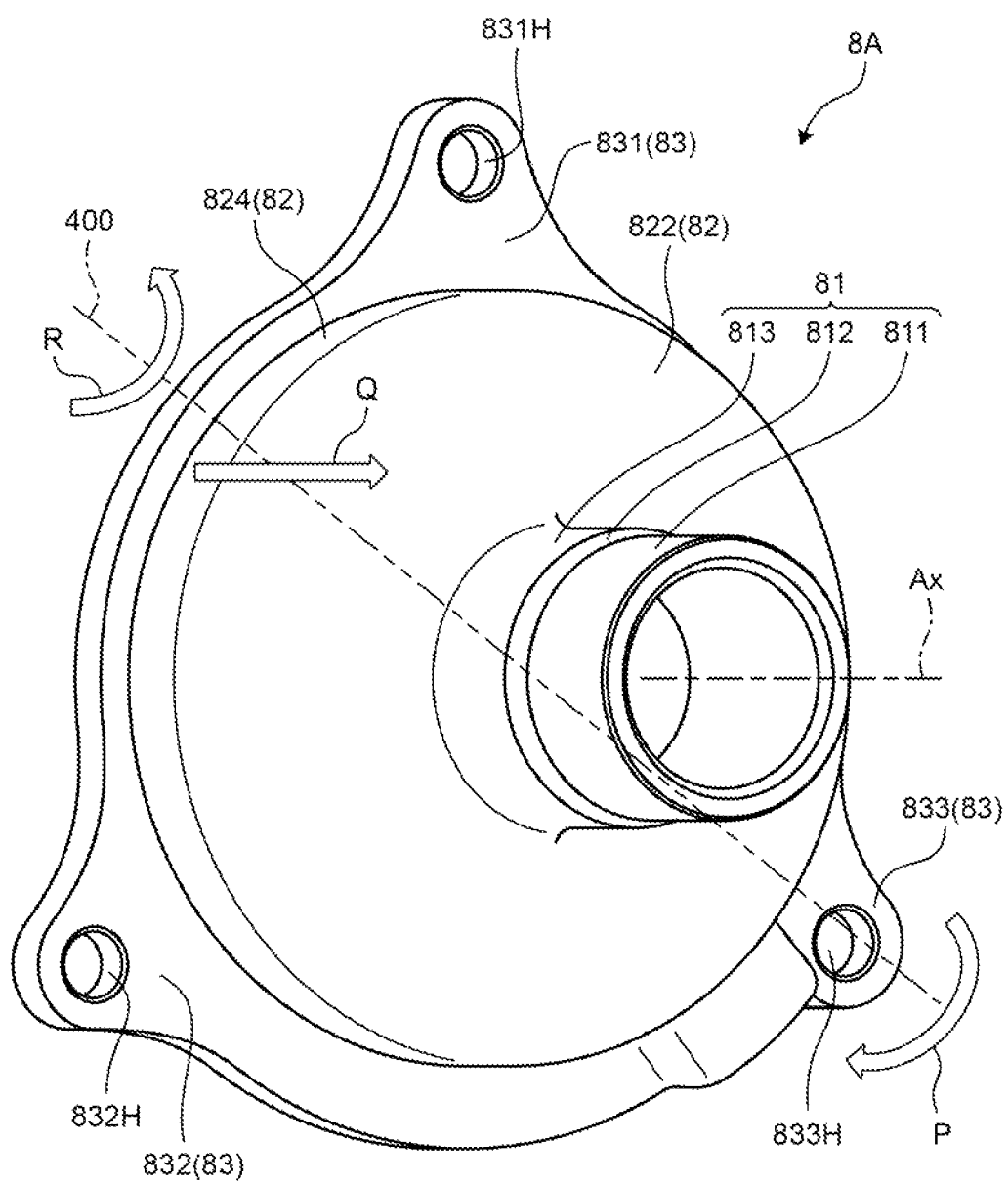
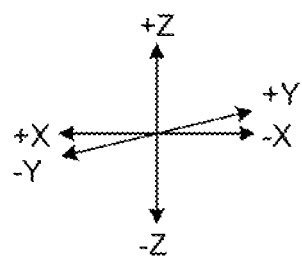

STEERING DEVICE

CROSS REFERENCE TO RELATED APPLICATIONS

This application is a National Stage of International Application No. PCT/JP2022/003986 filed Feb. 2, 2022, claiming priority based on Japanese Patent Application No. 2021-016328 filed Feb. 4, 2021.

FIELD

The present invention relates to a steering device.

BACKGROUND

A steering device of Patent Literature 1 includes a steering shaft which is coupled to a steering wheel and extends in an axial direction, and a steering column which is supported on an outer circumferential side of the steering shaft through a bearing. An end portion of the steering column is connected to the gearbox through a sensor housing. Specifically, the end portion of the steering column has a flange extending in a radial direction intersecting the axial direction, and the flange is connected to the sensor housing.

CITATION LIST

Patent Literature

Patent Literature 1: JP 6402617 B2

SUMMARY

Technical Problem

In cases such as when a vehicle turns a curve, a force may be applied from a driver to a steering wheel in the front-rear direction of the vehicle. In this case, the force is transmitted from the steering wheel to a steering column through a steering shaft. Therefore, it is desired to further improve the rigidity of the steering column.

The present disclosure has been made in view of the above problem, and an object of the present disclosure is to provide a steering device capable of further improving the rigidity of a steering column.

Solution to Problem

To achieve the above object, a steering device according to an embodiment of the present disclosure comprising: a steering shaft which extends along a central axis and to which a steering wheel is coupled on one side in an axial direction; a tubular steering column which is disposed on an outer circumferential side of the steering shaft and extends in an axial direction; and a gearbox which is disposed on an other side in an axial direction of the steering column and is fixed to the steering column, wherein the steering column includes a fixing member provided at an end on an other side in an axial direction and fixed to the gearbox, and an outer circumferential surface on one side in an axial direction of the fixing member has an outer diameter which increases toward an other side in an axial direction.

In cases such as when the vehicle turns a curve, a force may be applied from the driver to a steering wheel in the front-rear direction of the vehicle. In this case, for example, a bending or twisting force is applied to a fixing member of the steering column from the steering wheel through the steering shaft. Since the outer circumferential surface on one side in the axial direction of the fixing member has an outer diameter which increases toward the other side in the axial direction, the rigidity of the outer circumferential surface is higher than that of a flat surface extending in the radial direction, thereby suppressing deformation. Therefore, according to the present disclosure, it is possible to provide a steering device capable of further improving the rigidity of the steering column.

As a desirable embodiment of the steering device, an outer circumferential surface on one side in an axial direction of the fixing member is a straight line extending obliquely toward an other side in an axial direction in a cross section including the central axis. Therefore, the deformation of the fixing member is further suppressed when a twisting or bending force is applied to the fixing member, and the rigidity of the steering column can be further improved.

As a desirable embodiment of the steering device, the fixing member comprises a flange to be attached to the gearbox, and on a radially inner side of the flange and on an other side in an axial direction of the fixing member, a first rib which extends radially outward from the central axis is provided. A bending or twisting force is applied to the fixing member. Therefore, since the rigidity of the fixing member is increased by providing a first rib, the rigidity of the steering column can be further improved.

As a desirable embodiment of the steering device, on a radially inner side of the flange and on an other side in an axial direction of the fixing member, a second rib which intersects the first rib is provided. Therefore, the rigidity of the steering column can be further improved by providing a second rib.

As a desirable embodiment of the steering device the steering column includes: an upper column; a lower column disposed on an other side in an axial direction of the upper column, a portion of the lower column being fitted to the upper column; and the fixing member provided on an other side in an axial direction of the lower column and fixed to the gearbox, the fixing member has a reinforcing rib which protrudes from an outer circumferential surface on one side in an axial direction of the fixing member toward one side in an axial direction and an outer side in a radial direction, and at an end portion on an other side in an axial direction of the upper column, a protruding portion in which the reinforcing rib can be accommodated is provided.

The rigidity of the steering column including a disc portion is further improved by a reinforcing rib. In addition, a lower column has a protruding portion, at an end portion on the other side in the axial direction, in which the reinforcing rib can be accommodated. Therefore, when an upper column moves to the other side in the axial direction with respect to the lower column at the time of a secondary collision, interference between the upper column and the reinforcing rib can be suppressed.

Advantageous Effects of Invention

According to the present disclosure, it is possible to provide a steering device which further improves the rigidity of a steering column.

BRIEF DESCRIPTION OF DRAWINGS

FIG. 7 is a perspective view of a fixing member according to a second embodiment.

DESCRIPTION OF EMBODIMENTS

The present invention will be described below in detail with reference to the drawings. Note that the present invention is not limited by the following modes for carrying out the invention (hereinafter referred to as embodiments). Components in the following embodiments include those that can be easily assumed by those skilled in the art, those that are substantially the same, and those in a so-called equivalent range. Further, the components disclosed in the following embodiments may be combined as appropriate. Note that, in the following description, an XYZ orthogonal coordinate system is used. The X-axis is parallel to the axis of a steering shaft. The Y-axis is parallel to the vehicle width direction of a vehicle on which a steering device is mounted. The Z-axis is perpendicular to both the X-axis and the Y-axis. A direction parallel to the X-axis is described as an X direction, a direction parallel to the Y-axis is described as a Y direction, and a direction parallel to the Z-axis is described as a Z direction. In the X direction, a direction toward the front of the vehicle is defined as a +X direction, and a direction toward the rear is defined as a −X direction. When the operator faces the +X direction, the right direction is defined as a +Y direction, and the left direction is defined as a −Y direction. In the Z direction, an upward direction is defined as a +Z direction, and a downward direction is defined as a −Z direction. The X direction is referred to as an "axial direction", the −X direction side is referred to as "one side in the axial direction", and the +X direction side is referred to as "the other side in the axial direction".

First Embodiment

Figure 1:
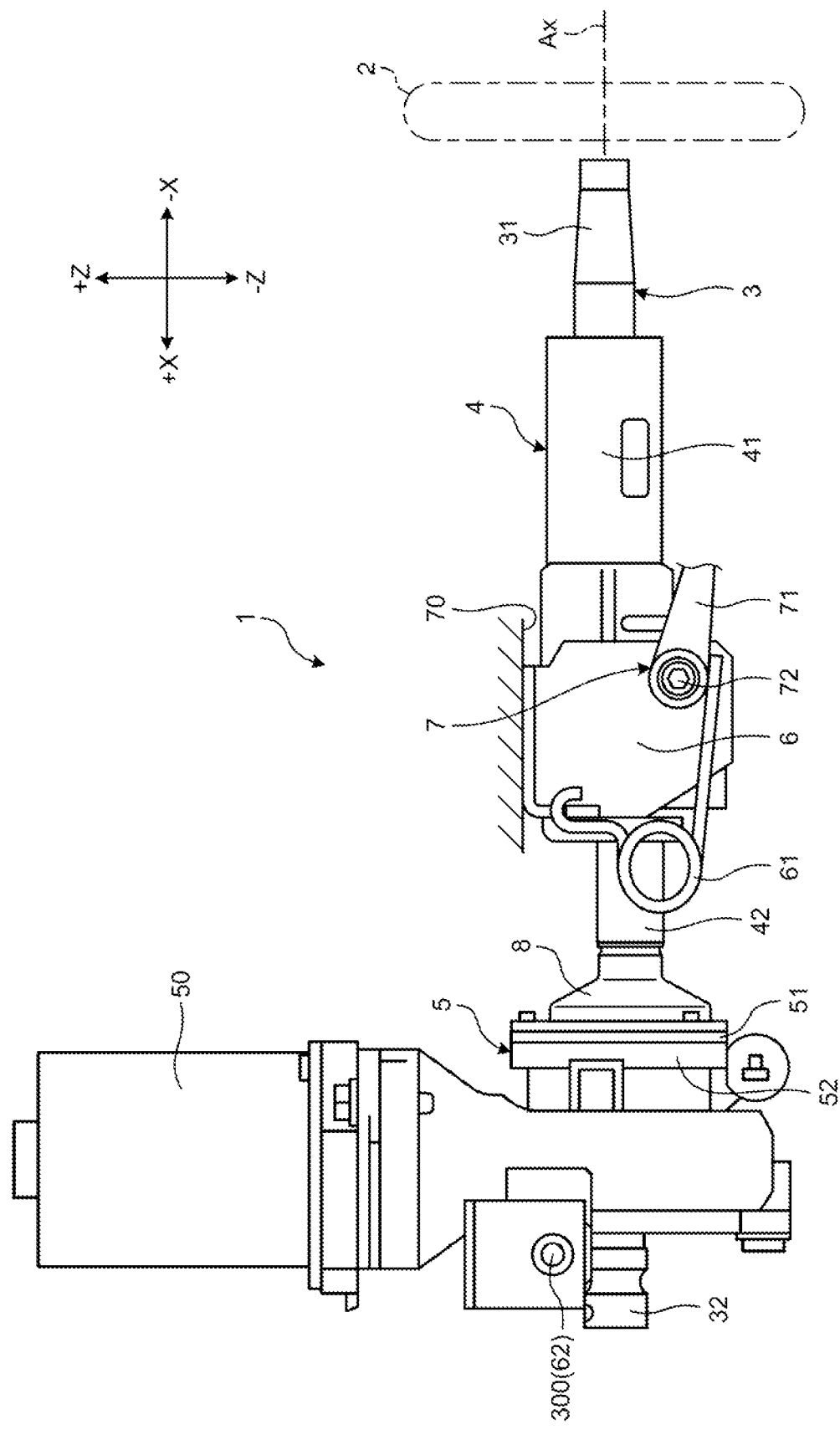
FIG. 1 is a schematic side view of a steering device according to a first embodiment.

FIG. 1 is a schematic side view of a steering device according to a first embodiment.

The basic configuration of a steering device 1 will be first described. As illustrated in FIG. 1, the steering device 1 includes a steering wheel 2, a steering shaft 3, a steering column 4, a gearbox 5, a tilt bracket 6, a fastening mechanism 7, and a motor 50.

As illustrated in FIG. 1, the steering wheel 2 is coupled to an end portion of the steering shaft 3 in the −X direction. When a driver operates the steering wheel 2, the steering shaft 3 is rotated about the central axis Ax, and an operation torque is applied to the steering shaft 3.

The gearbox 5 is provided at the end portion of the steering column 4 in the +X direction (the other side in the axial direction). The motor 50 is assembled to the gearbox 5. The motor 50 is an electronic control unit (ECU) integrated motor. Therefore, the steering device 1 according to the present embodiment is an electric power steering device which assists steering of the driver by the motor 50.

The steering shaft 3 includes an upper shaft 31 and a lower shaft 32. The upper shaft 31 and the lower shaft 32 are cylindrical shafts. The steering wheel 2 is attached to the end portion of the upper shaft 31 in the −X direction. In other words, the steering wheel 2 is coupled to one side of the steering shaft 3 in the axial direction. The end portion of the upper shaft 31 in the +X direction is externally fitted to the lower shaft 32. The end portion of the upper shaft 31 in the +X direction and the end portion of the lower shaft 32 in the −X direction are spline-fitted to each other. Therefore, the upper shaft 31 is slidable in the X direction with respect to the lower shaft 32.

As illustrated in FIG. 1, the steering column 4 is an outer cylinder that extends in the X direction (axial direction) and is disposed on the outer circumferential side of the steering shaft 3. The steering column 4 includes an upper column 41, a lower column 42, and a fixing member 8. The upper column 41 is a column disposed closer to the steering wheel 2. The lower column 42 is a column disposed in the +X direction with respect to the upper column 41 and separated from the steering wheel 2. The upper column 41 and the lower column 42 are tubular-shaped, and the end portion of the upper column 41 in the +X direction is fitted to the end portion of the lower column 42 in the −X direction. At the time of a secondary collision, the upper column 41 is movable in the +X direction with respect to the lower column 42. The end portion of the lower column 42 in the +X direction is fixed to the gearbox 5 through the fixing member 8. The fixing member 8 will be described later in detail.

The tilt bracket 6 is provided on the outer circumferential side of the steering column 4. The tilt bracket 6 is provided with the fastening mechanism 7. The fastening mechanism 7 includes an operation lever 71 and a fastening shaft 72 which supports the end portion of the operation lever 71. The movement of the upper column 41 in the Z direction is allowed or restricted by the operation of the operation lever 71, and the position of the steering wheel 2 in the Z direction is fixed. Thus, the steering device 1 according to the present embodiment has a tilt function. Note that the tilt bracket 6 is fixed to a vehicle body member 70. A tilt spring 61 is, for example, a torsion coil spring. The tilt spring 61 applies an upward (+Z direction) force to the steering column 4. Thus, even when the fixation of the tilt position is released by the operation of rotating the operation lever 71, the steering column 4 is less likely to fall off downward (in the −Z direction). A pivot bracket 62 is fixed to a vehicle body side member, and supports the steering column 4 so as to be swingable about a swing central axis 300. Thus, the steering column 4 is supported to be swingable in the tilt direction.

Figure 2:
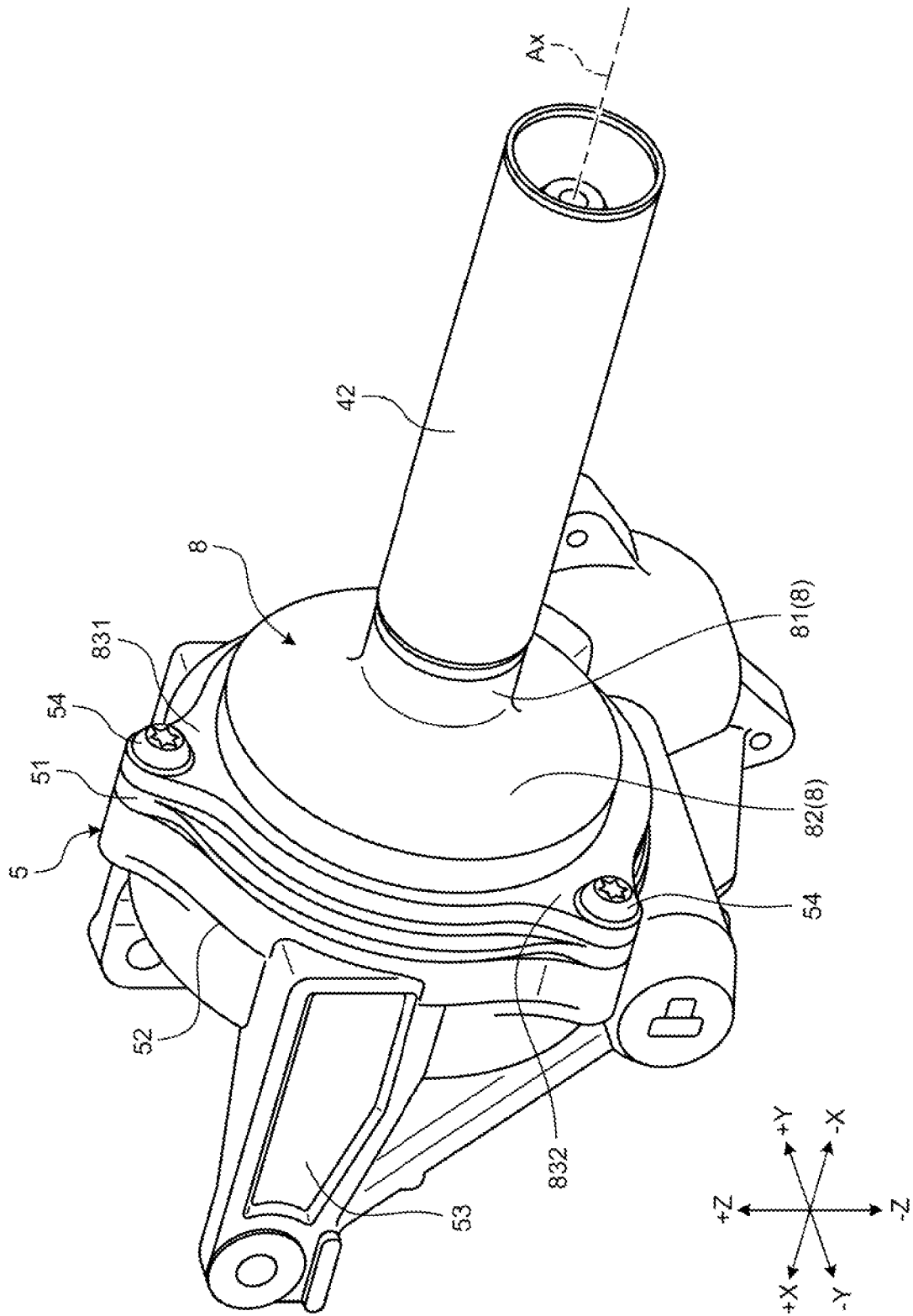
FIG. 2 is a perspective view illustrating a portion of FIG. 1.

FIG. 2 is a perspective view illustrating a portion of FIG. 1. As illustrated in FIG. 2, the gearbox 5 includes a plate 51, a main body portion 52, and a leg portion 53. The main body portion 52 accommodates a plurality of gears therein. The leg portion 53 is provided on the outer side (lateral side) of the main body portion 52 in the Y direction and extends in the +X direction. The plate 51 seals an opening of the main body portion 52 in the −X direction. In other words, the plate 51 is fixed to the fixing member 8 and the main body portion 52 through bolts 54 provided at three positions along the circumferential direction around the central axis Ax in a state of being sandwiched between the fixing member 8 and the main body portion 52.

Figure 3:
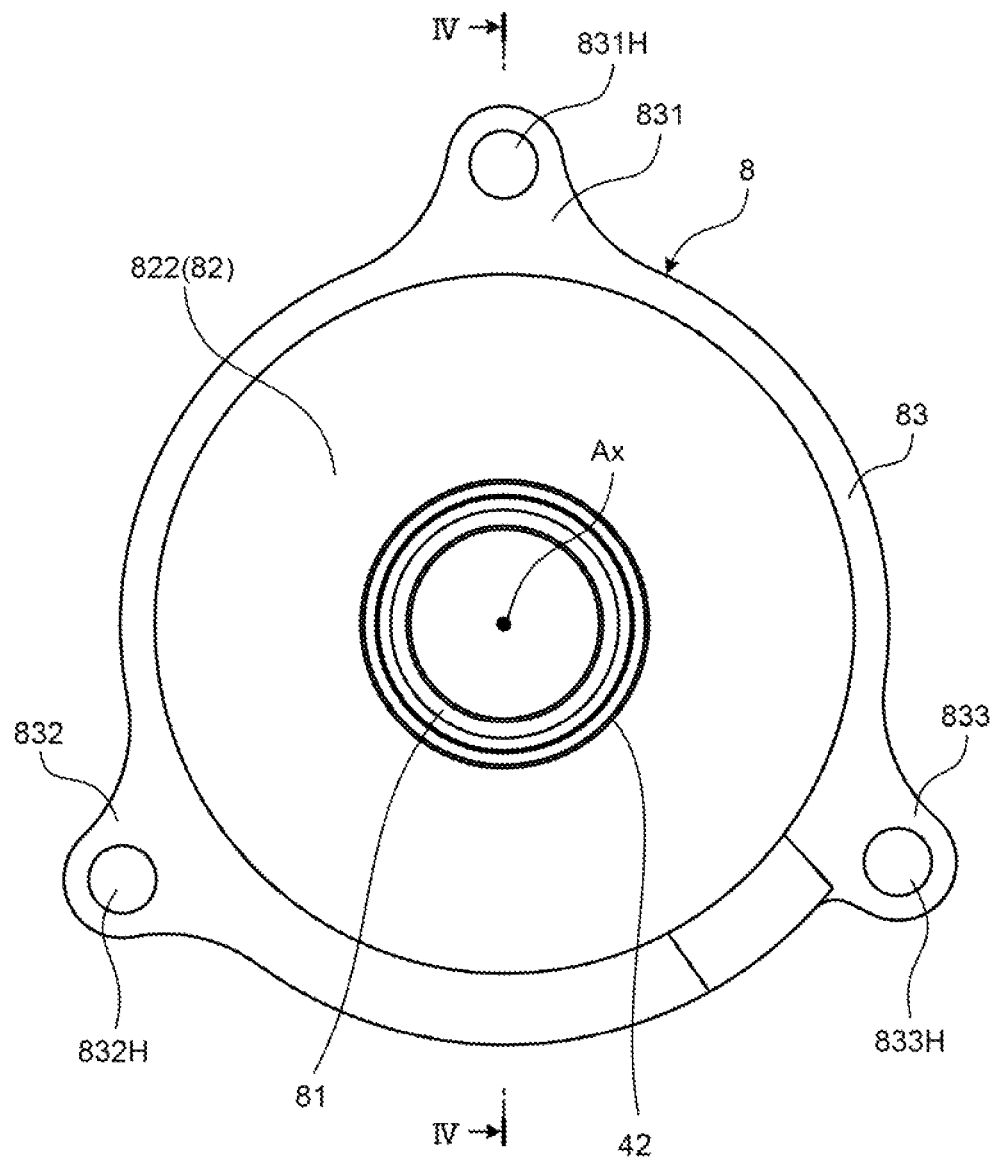
FIG. 3 is a front view of a lower column and a fixing member in FIG. 2 as viewed from the −X direction toward the +X direction.
Figure 4:
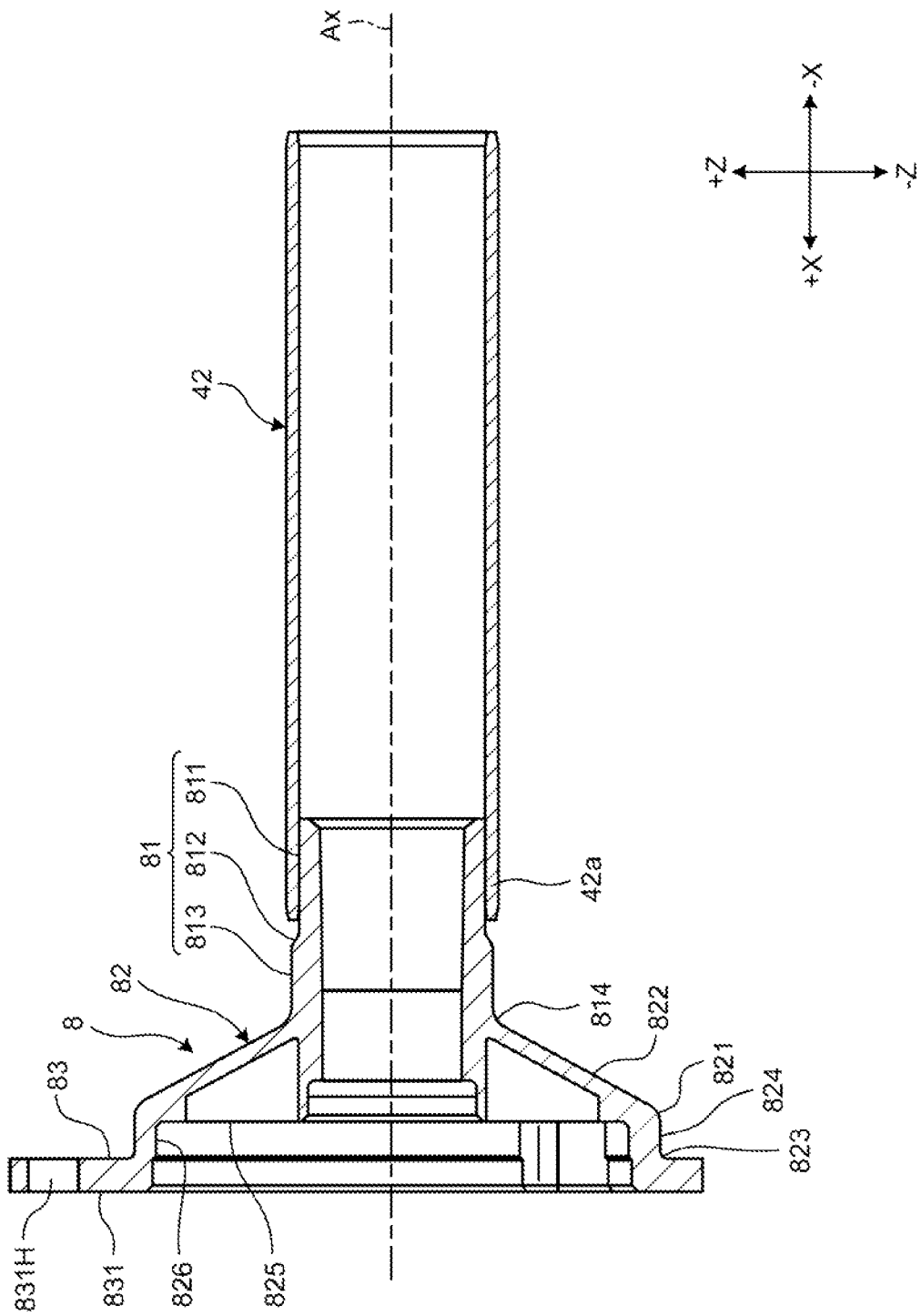
FIG. 4 is a cross-sectional view taken along line IV-IV of FIG. 3.
Figure 5:
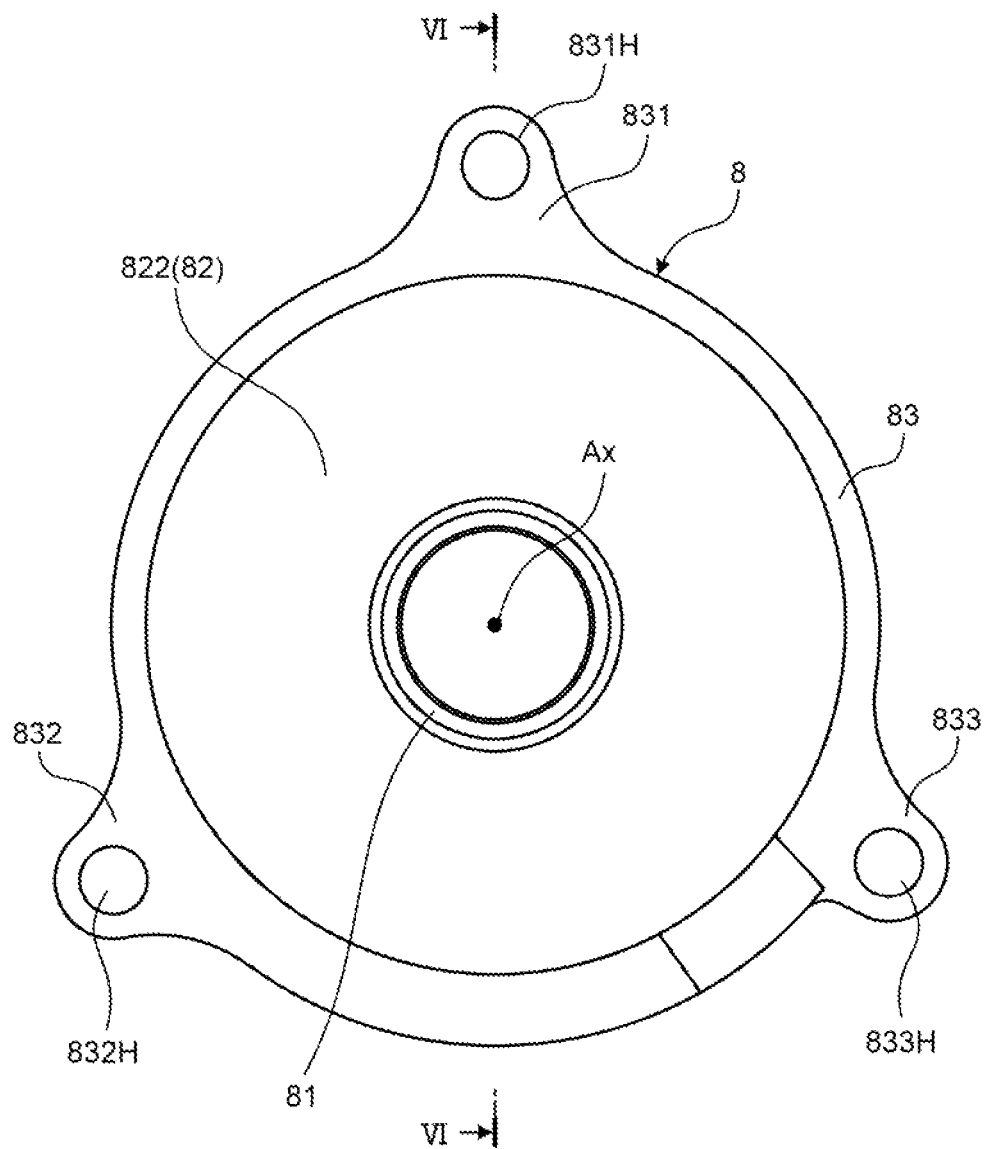
FIG. 5 is a front view of the fixing member as viewed from the −X direction toward the +X direction.
Figure 6:
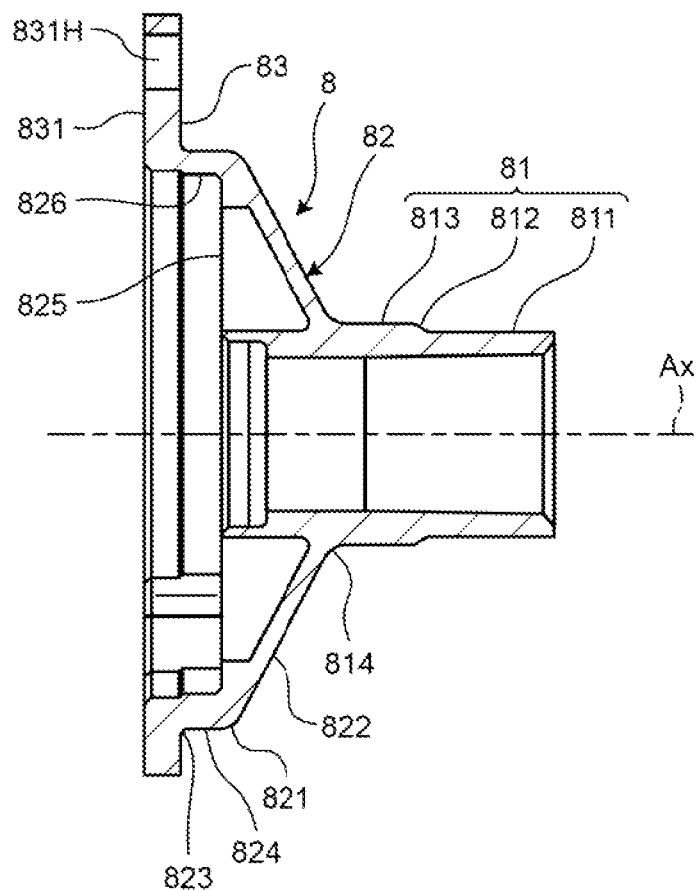
FIG. 6 is a cross-sectional view taken along line VI-VI of FIG. 5.

FIG. 3 is a front view of the lower column and the fixing member in FIG. 2 as viewed from the −X direction toward the +X direction. FIG. 4 is a cross-sectional view taken along line IV-IV of FIG. 3. FIG. 5 is a front view of the fixing member as viewed from the −X direction toward the +X direction. FIG. 6 is a cross-sectional view taken along line VI-VI of FIG. 5.

As illustrated in FIGS. 2, 3, and 4, the lower column 42 is a cylindrical member having a cylindrical shape along the circumferential direction around the central axis Ax. An end portion 42a of the lower column 42 in the +X direction is fitted to the outer circumferential side of a tubular portion 81 of the fixing member 8.

As illustrated in FIGS. 2 to 6, the fixing member 8 includes the tubular portion 81, a disc portion 82, and a flange 83. The fixing member 8 has an annular ring shape along the circumferential direction around the central axis Ax.

The tubular portion 81 has a small-diameter portion 811, an inclined portion 812, and a large-diameter portion 813. The small-diameter portion 811 is positioned in the −X direction in the tubular portion 81. The outer circumferential surface of the inclined portion 812 has an outer diameter which increases toward the +X direction. The large-diameter portion 813 is positioned in the +X direction in the tubular portion 81. The large-diameter portion 813 has an outer diameter larger than that of the small-diameter portion 811. The lower column 42 is fitted to the small-diameter portion 811.

The disc portion 82 has an annular ring shape extending radially outward about the central axis Ax. Specifically, the −X direction surface of the disc portion 82 includes an inclined surface 822 extending radially outward from an end 814 of the tubular portion 81 in the +X direction to an end 821, and a cylindrical surface 824 extending from the end 821 to the end 823. The inclined surface 822 has a shape of a part of a conical surface. Thus, the inclined surface 822, which is the outer circumferential surface on one side in the axial direction of the fixing member 8 has an outer diameter which increases toward the other side in the axial direction. In other words, the inclined surface 822 of the fixing member 8 is a straight line extending obliquely toward the other side in the axial direction in the cross section including the central axis Ax. Note that, as illustrated in FIGS. 4 and 6, the +X direction surface of the disc portion 82 has an orthogonal surface 825 on the opposite side of the inclined surface 822 and a cylindrical surface 826 on the opposite side of the cylindrical surface 824.

The flange 83 extends in an annular ring shape along a direction around the central axis Ax. As illustrated in FIGS. 3 and 5, the flange 83 has protrusions 831, 832, and 833 which protrude radially outward. The protrusions 831, 832, and 833 are provided at three positions at equal intervals along the circumferential direction around the central axis Ax. The protrusions 831, 832, and 833 are provided with through-holes 831H, 832H, and 833H. As described above, the bolts 54 illustrated in FIG. 2 can be inserted into the through-holes 831H, 832H, and 833H. The protrusions 831, 832, and 833 are fixed to the plate 51 of the gearbox 5 illustrated in FIG. 1 through the bolts 54. In other words, the flange 83 is attached to the gearbox 5.

As described above, the steering device 1 according to the first embodiment includes: the tubular steering column 4 which is disposed on the outer circumferential side of the steering shaft 3 and extends in the axial direction; and the gearbox 5 which is disposed on the other side in the axial direction of the steering column 4 and is fixed to the steering column 4. The steering column 4 includes the fixing member 8 provided at an end on the other side in the axial direction and fixed to the gearbox 5, and the inclined surface 822 which is an outer circumferential surface on one side in the axial direction of the fixing member 8 has an outer diameter which increases toward the other side in the axial direction.

In cases such as when the vehicle turns a curve, a force may be applied from the driver to the steering wheel 2 in the front-rear direction of the vehicle. In this case, for example, a bending or twisting force is applied to the fixing member 8 of the steering column 4 from the steering wheel 2 through the steering shaft 3. Since the inclined surface 822, which is the outer circumferential surface on one side in the axial direction of the fixing member 8, has an outer diameter which increases toward the other side in the axial direction, the rigidity of the inclined surface is higher than that of a flat surface extending in the radial direction. Therefore, the deformation of the fixing member 8 is suppressed when a twisting or bending force is applied to the fixing member 8, and thus the rigidity of the entire steering column 4 can be improved.

The inclined surface 822 of the fixing member 8 is a straight line extending obliquely toward the other side in the axial direction in the cross section including the central axis Ax. In other words, the inclined surface 822 has a shape of a side surface of a truncated cone. Therefore, the rigidity of the fixing member 8 is further increased, and the deformation of the fixing member 8 is further suppressed when a twisting or bending force is applied to the fixing member 8.

Second Embodiment

Figure 8:
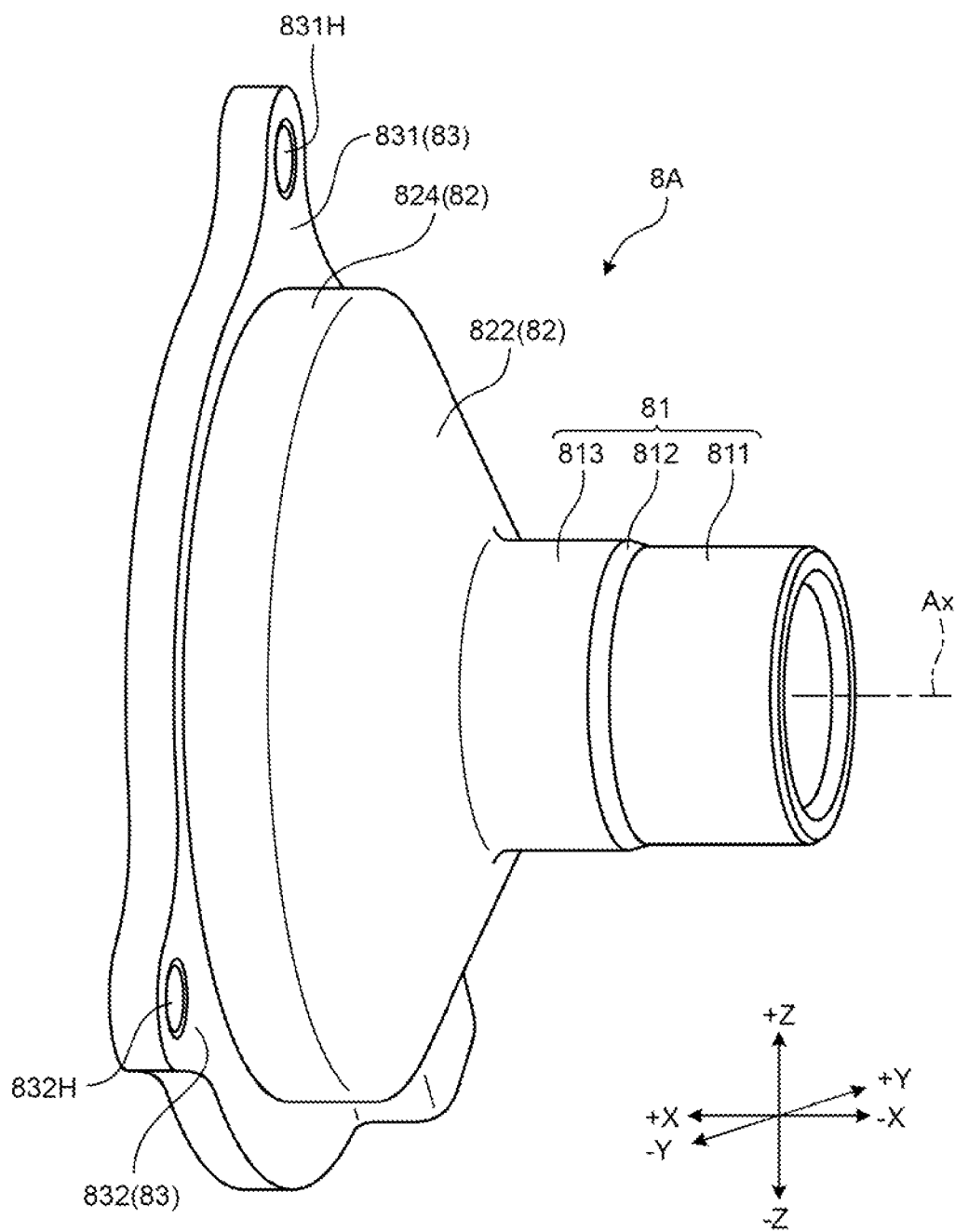
FIG. 8 is a perspective view of the fixing member according to the second embodiment.
Figure 9:
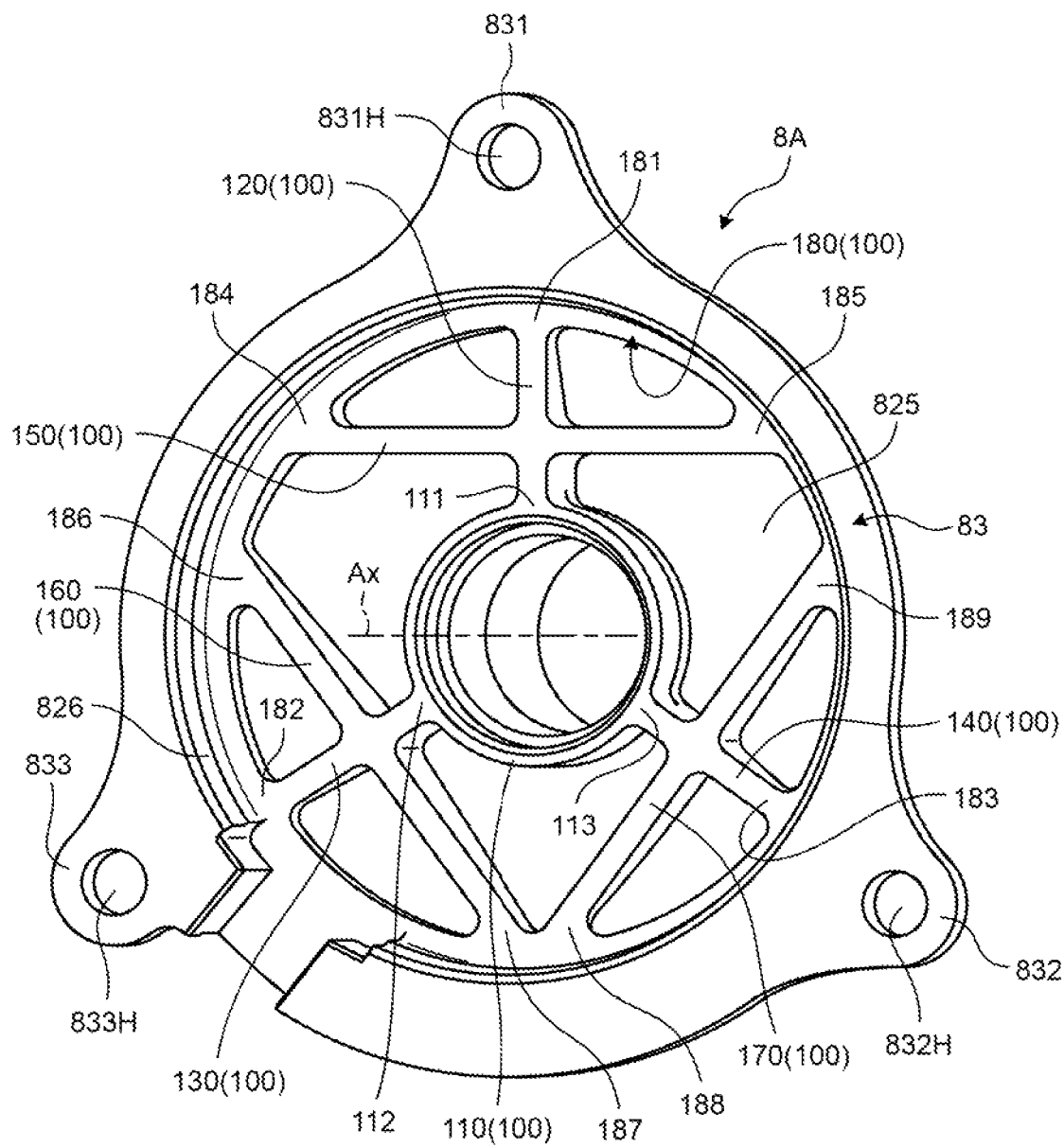
FIG. 9 is a rear view of the fixing member according to the second embodiment as viewed from the +X direction toward the −X direction.

A second embodiment will now be described. Note that portions having the same structure as in the first embodiment are denoted by the same reference numerals, and description thereof will be omitted. FIG. 7 is a perspective view of a fixing member according to the second embodiment. FIG. 8 is a perspective view of the fixing member according to the second embodiment. FIG. 9 is a rear view of the fixing member according to the second embodiment as viewed from the +X direction toward the −X direction.

The second embodiment is different from the first embodiment in that a rib is provided on the rear surface side of the fixing member. This will be described in detail below.

As illustrated in FIGS. 7 and 8, the −X direction surface (surface on the front surface side) of a fixing member 8A according to the second embodiment has a conical surface as in the fixing member 8 according to the first embodiment. However, as illustrated in FIG. 9, a plurality of ribs 100 is provided on the +X direction side (rear surface side) of the fixing member 8A according to the second embodiment. The rib 100 is provided on the radially inner side of the flange 83 and on the other side in the axial direction of the fixing member 8A.

As illustrated in FIG. 9, the rib 100 includes an annular rib 110, first ribs 120, 130, and 140, second ribs 150, 160, and 170, and an annular rib 180.

The annular rib 110 is an annular ring-shaped rib provided at the central portion and centered on the central axis Ax. The annular rib 180 is an annular ring-shaped rib provided on the outer circumferential edge and centered on the central axis Ax. The first ribs 120, 130, and 140 extend radially outward from the annular rib 110 to the annular rib 180. The first ribs 120, 130, and 140 are linear ribs connecting the annular rib 110 and the annular rib 180. The first rib 120 extends along a straight line connecting the central axis Ax and the through-hole 831H. The first rib 130 extends along a straight line connecting the central axis Ax and the through-hole 833H. The first rib 140 extends along a straight line connecting the central axis Ax and the through-hole 832H. In other words, the first rib 120 extends from a portion 111 of the annular rib 110 in the +Z direction to a portion 181 of the annular rib 180. The first rib 130 extends from a portion 112 of the annular rib 110 in the +Y direction and the −Z direction to a portion 182 of the annular rib 180. The first rib 140 extends from a portion 113 of the annular rib 110 in the −Y direction and the −Z direction to a portion 183 of the annular rib 180.

The second ribs 150, 160, and 170 extend so as to be orthogonal to (intersect) the first ribs 120, 130, and 140, respectively. Note that, in the embodiment, the first rib and the second rib are orthogonal to each other, but in the present disclosure, the first rib and the second rib may intersect with each other. The second rib 150 is orthogonal to (intersects) the first rib 120. The second rib 160 is orthogonal to (intersects) the first rib 130. The second rib 170 is orthogonal to (intersects) the first rib 140. In other words, the second rib 150 extends along a straight line connecting a portion 184 and a portion 185 of the annular rib 180, and is orthogonal to (intersects) the first rib 120. The second rib 160 extends along a straight line connecting a portion 186 and a portion 187 of the annular rib 180, and is orthogonal to (intersects) the first rib 130. The second rib 170 extends along a straight line connecting a portion 188 and a portion 189 of the annular rib 180, and is orthogonal to (intersects) the first rib 140.

Note that a force P illustrated in FIG. 7 is a force applied to the protrusion 833 along the circumferential direction when the driver rotates the steering wheel 2 clockwise. A upper force Q is a force applied to an intermediate portion between the protrusion 831 and the protrusion 832 in the flange 83 with the protrusion 833 as a fulcrum. The force Q is directed in the −X direction in which the fixing member 8A moves away from the gearbox 5. A force R is a force that acts in a direction of rotation about a central axis 400 that is a dashed-and-double-dotted line connecting the intermediate portion between the protrusion 831 and the protrusion 832 and the protrusion 833.

As described above, the fixing member 8A according to the second embodiment includes the flange 83 to be attached to the gearbox 5, and on the radially inner side of the flange 83 and on the other side (rear side) in the axial direction of the fixing member 8A, first ribs 120, 130, and 140 which extend radially outward from the central axis Ax are provided.

As described in the first embodiment, a bending or twisting force is applied to the fixing member 8A. Therefore, the rigidity of the fixing member 8A is increased by providing the first ribs 120, 130, and 140. For example, when the forces P or Q illustrated in FIG. 7 are applied to the fixing member 8A, the deformation is further suppressed by the first ribs 120, 130, and 140. Thus, the deformation of the fixing member 8A is further suppressed when a twisting or bending force is applied to the fixing member 8A.

Since the fixing member 8A includes the second ribs 150, 160, and 170 in addition to the first ribs 120, 130, and 140, the rigidity is further improved as compared with the case of only the first ribs 120, 130, and 140. For example, when the force R illustrated in FIG. 7 is applied to the fixing member 8A, the deformation is further suppressed by the second ribs 150, 160, and 170. Thus, the deformation of the fixing member 8A is further suppressed when a twisting or bending force is applied to the fixing member 8A.

Third Embodiment

Figure 10:
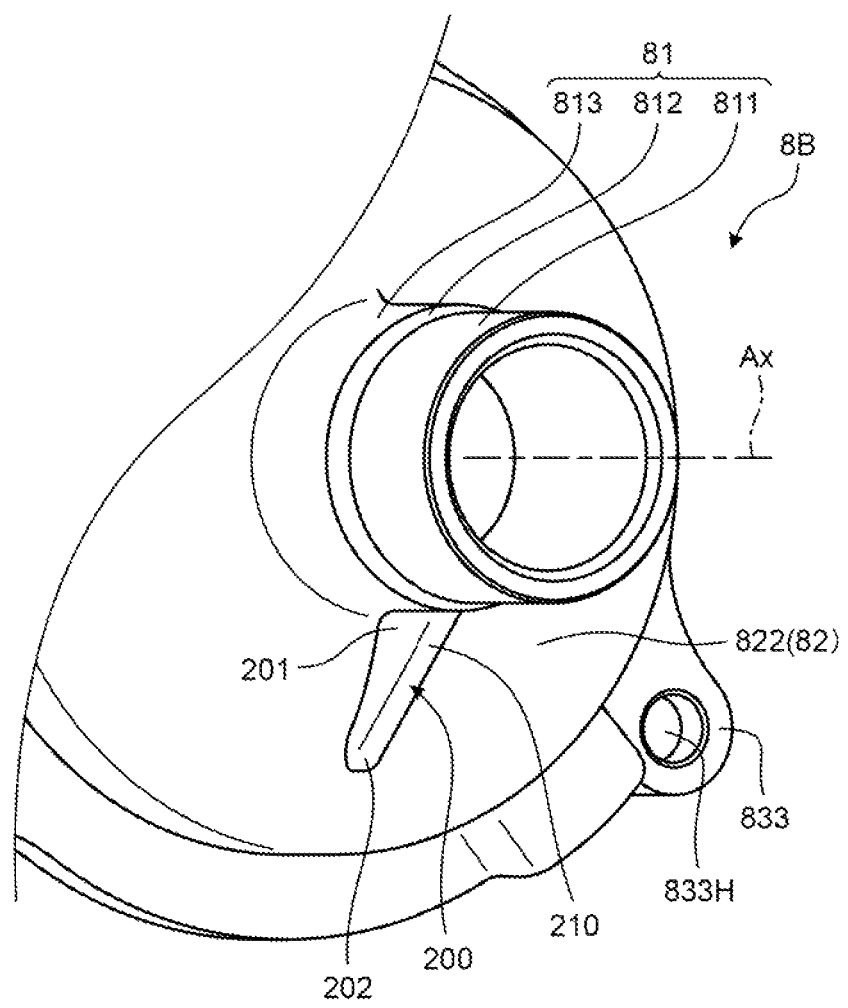
FIG. 10 is a perspective view of a fixing member according to a third embodiment.
Figure 11:
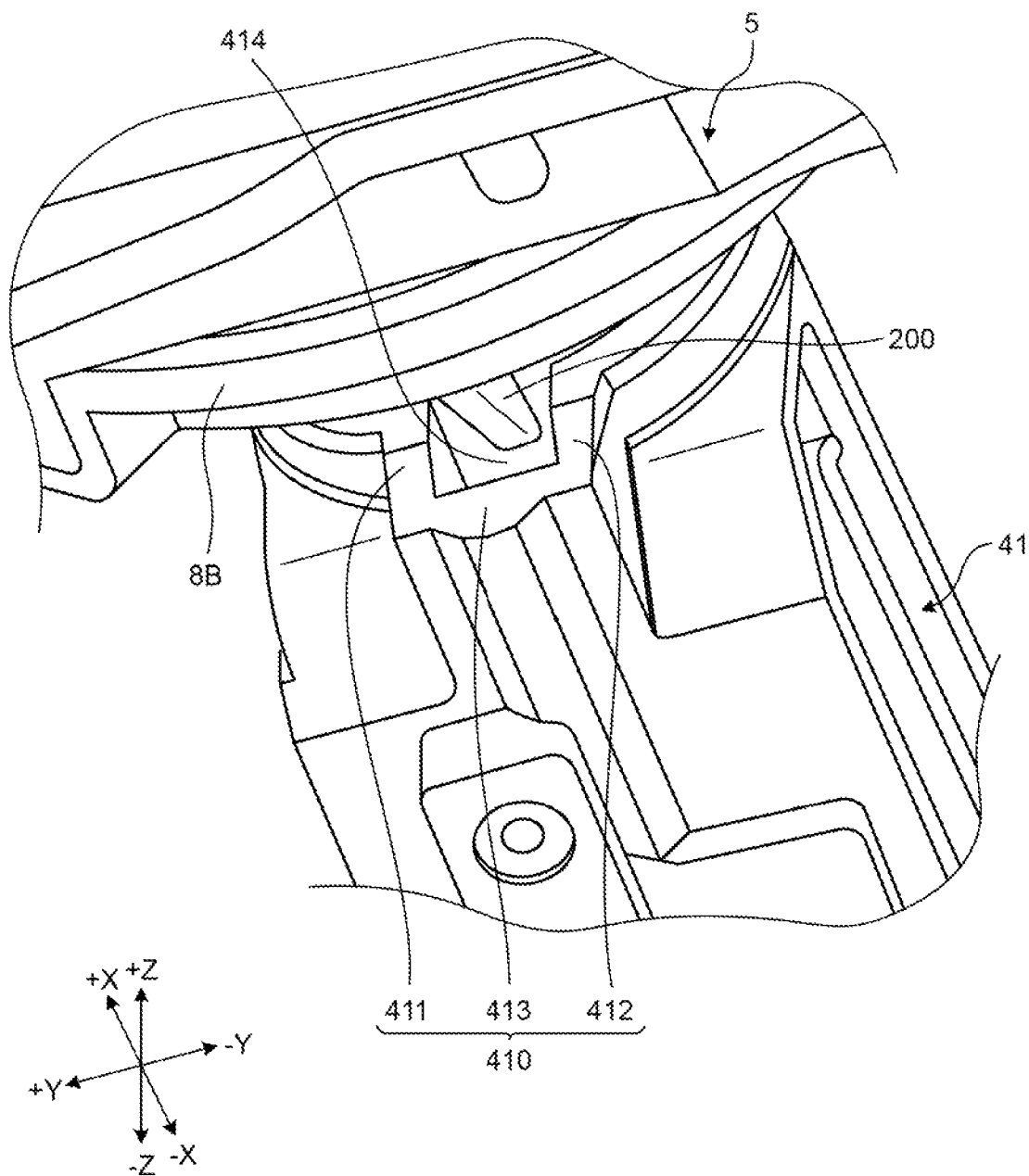
FIG. 11 is a perspective view of the periphery of the fixing member according to the third embodiment as viewed from the −Z direction toward the +Z direction, and illustrates a state in which an upper column has moved in the +X direction at the time of a secondary collision.
Figure 12:
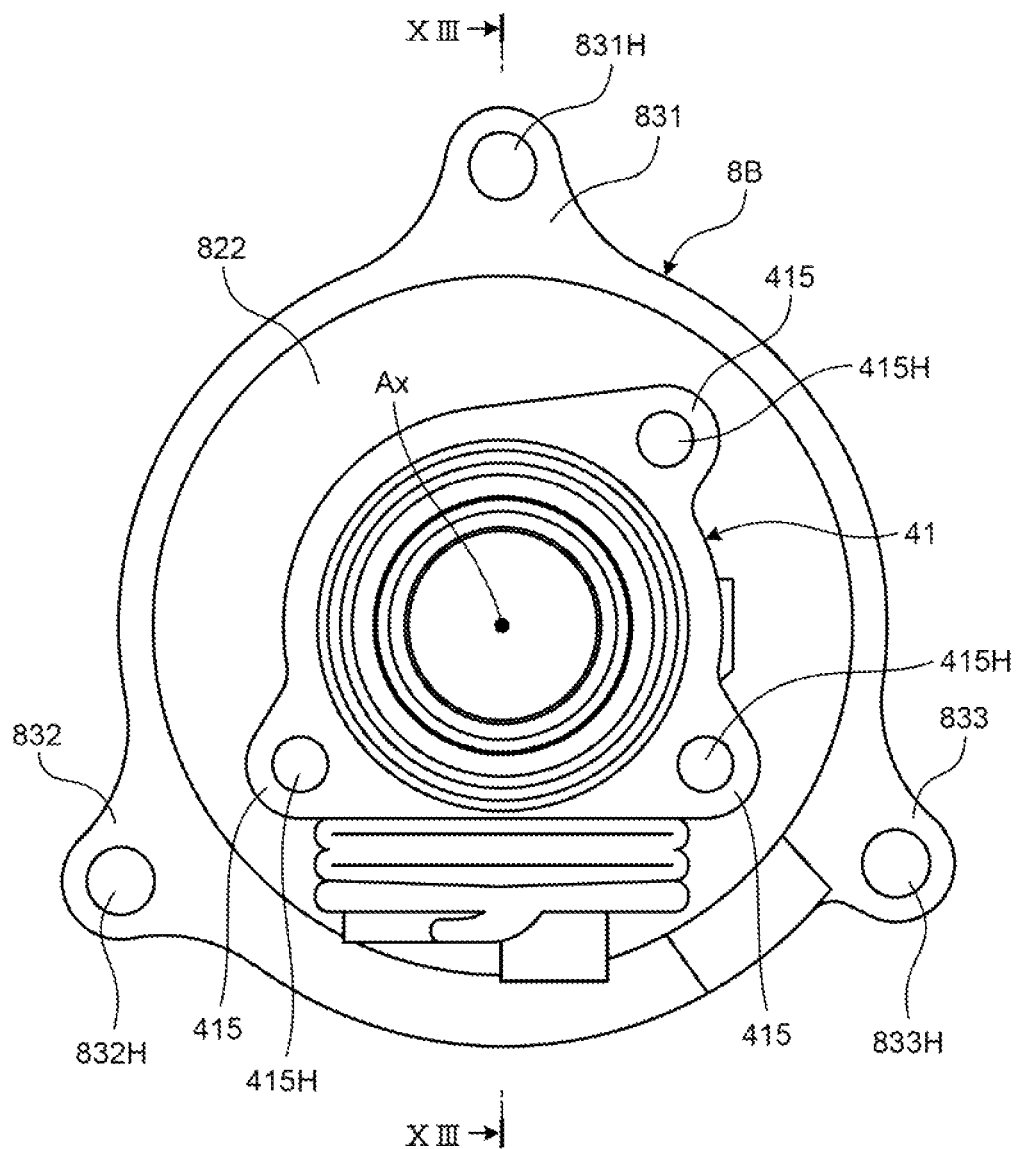
FIG. 12 is a front view of the lower column, the upper column, and the fixing member in the state of FIG. 11 as viewed from the −X direction toward the +X direction.
Figure 13:
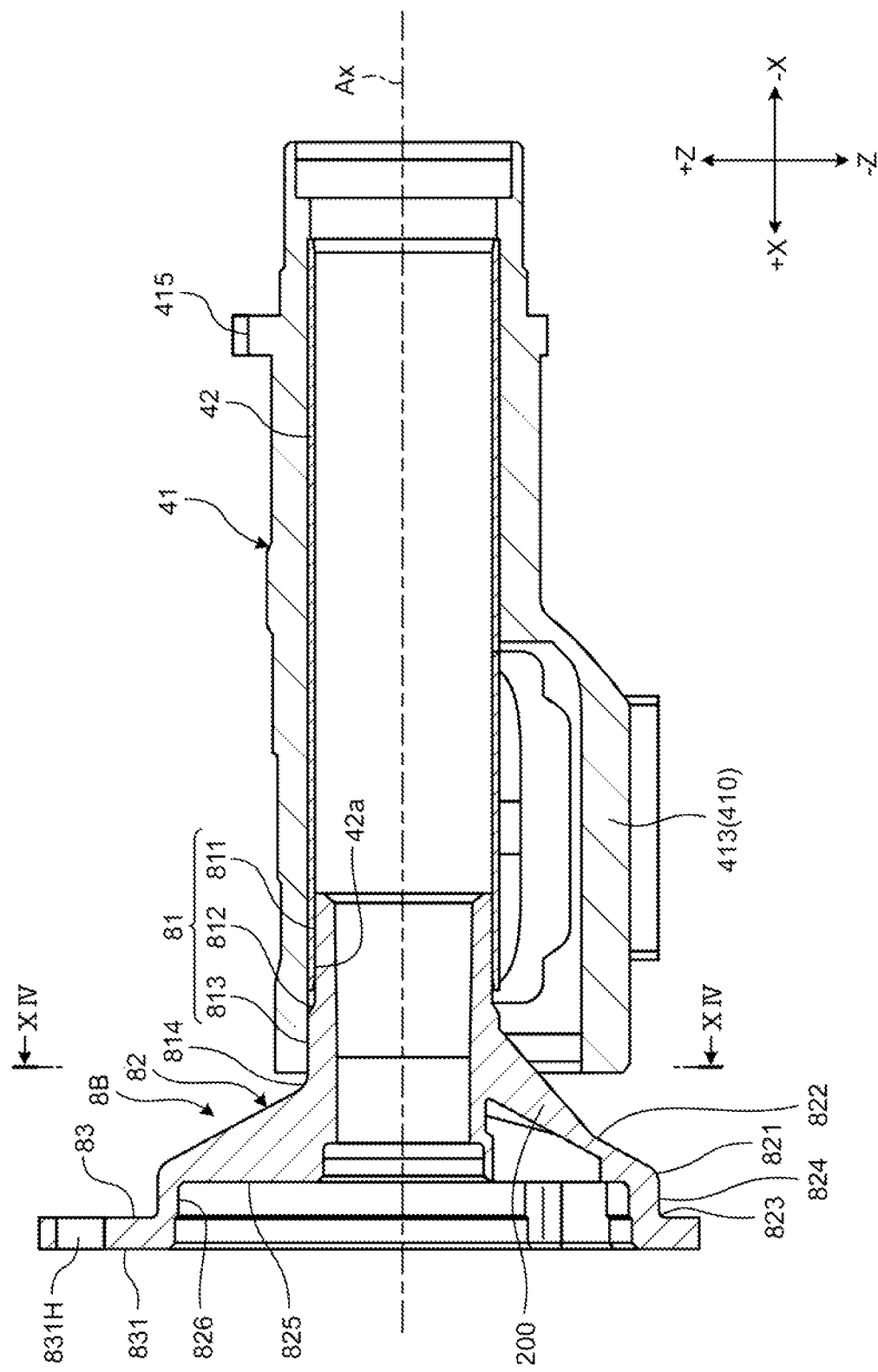
FIG. 13 is a cross-sectional view taken along line XIII-XIII of FIG. 12.
Figure 14:
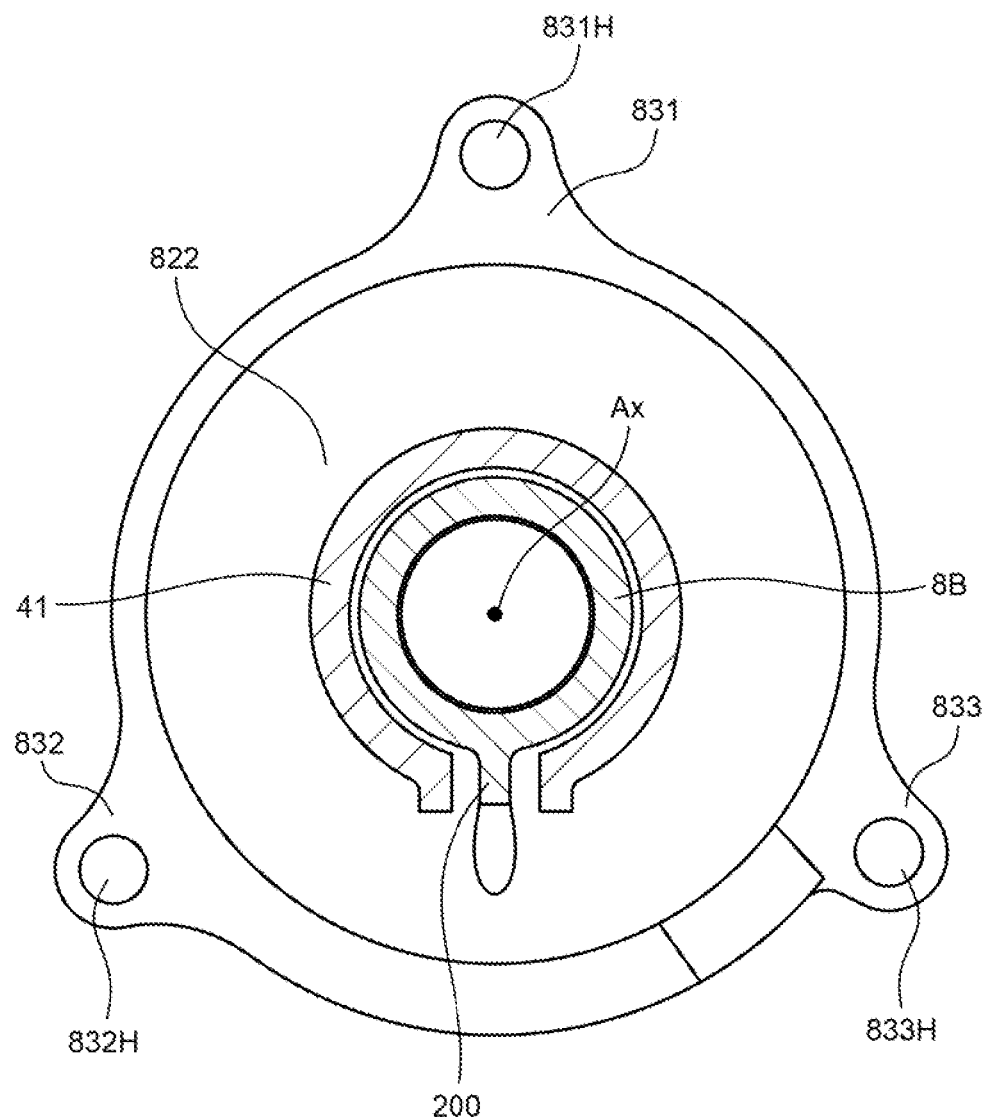
FIG. 14 is a cross-sectional view taken along line XIV-XIV of FIG. 13.

A third embodiment will now be described. Note that portions having the same structure as in the first embodiment or the second embodiment are denoted by the same reference numerals, and description thereof will be omitted. FIG. 10 is a perspective view of a fixing member according to the third embodiment. FIG. 11 is a perspective view of the periphery of the fixing member according to the third embodiment as viewed from the −Z direction toward the +Z direction, and illustrates a state in which the upper column has moved in the +X direction at the time of a secondary collision. FIG. 12 is a front view of the lower column, the upper column, and the fixing member in the state of FIG. 11 as viewed from the −X direction toward the +X direction. FIG. 13 is a cross-sectional view taken along line XIII-XIII of FIG. 12. FIG. 14 is a cross-sectional view taken along line XIV-XIV of FIG. 13.

The third embodiment is different from the first embodiment in that a reinforcing rib is provided on the front surface side (−X direction side) of the fixing member. This will be described in detail below.

A fixing member 8B according to the third embodiment has a reinforcing rib 200 on the front surface side (one side in the axial direction, the −X direction side). The reinforcing rib 200 has a triangular shape when viewed from the side thereof. The reinforcing rib 200 protrudes from the inclined surface 822 in the −X direction. The reinforcing rib 200 is fixed to the tubular portion 81. The height of the reinforcing rib 200 is highest at an end 201 on the large-diameter portion 813 side of the tubular portion 81 and is lowest at an end 202 on the outer side in the radial direction. Therefore, an upper surface 210 of the reinforcing rib 200 becomes lower from the end 201 on the large-diameter portion 813 side toward the outer side in the radial direction.

FIGS. 11 to 14 illustrate a state in which the upper column 41 has moved to the fixing member 8B in the +X direction at the time of a secondary collision. In other words, at the time of a secondary collision of the vehicle, a force is applied from the driver to the steering wheel 2 toward the front of the vehicle. In this case, the force is transmitted from the steering wheel 2 to the upper column 41 through the steering shaft 3. Normally, the upper column 41 is fitted to the lower column 42, but when the force transmitted to the upper column 41 becomes larger than the fitting force with the lower column 42, the upper column 41 slides on the outer circumferential side of the lower column 42. Thus, at the time of a secondary collision of the vehicle, as illustrated in FIG. 13, the front end of the upper column 41 may be positioned in the vicinity of the fixing member 8B. As illustrated in FIGS. 11 to 14, a protruding portion 410 which protrudes downward is provided on the lower side (−Z direction) of the upper column 41. The protruding portion 410 has a U-shape in a cross section orthogonal to the central axis Ax. The protruding portion 410 includes a pair of left and right first plate portion 411 and second plate portion 412 which extend in the Z direction, and a coupling plate 413 which couples a lower end of the first plate portion 411 and a lower end of the second plate portion 412. A recessed portion 414 surrounded by the first plate portion 411, the second plate portion 412, and the coupling plate 413 has a height larger than the maximum height (i.e., the height at the end 201 on the large-diameter portion 813 side of the tubular portion 81) of the reinforcing rib 200.

Note that, as illustrated in FIGS. 12 and 13, three protrusions 415 protruding radially outward are provided on the outer circumferential surface of the end portion of the upper column 41 in the −X direction. The protrusion 415 is formed with a through-hole 415H penetrating in the plate thickness direction.

As described above, the fixing member 8B according to the third embodiment has the reinforcing rib 200 which protrudes from the outer circumferential surface on one side in the axial direction of the fixing member 8B toward one side in the axial direction and the outer side in the radial direction, and at the end portion on the other side in the axial direction of the upper column 41, the protruding portion 410 in which the reinforcing rib 200 can be accommodated is provided.

The rigidity of the disc portion 82 is improved by the reinforcing rib 200. The upper column 41 has the protruding portion 410, at an end portion on the other side in the axial direction, in which the reinforcing rib 200 can be accommodated. Therefore, when the upper column 41 moves forward with respect to the lower column 42 at the time of a secondary collision, interference between the upper column 41 and the reinforcing rib 200 can be suppressed.

REFERENCE SIGNS LIST

1 STEERING DEVICE
2 STEERING WHEEL
3 STEERING SHAFT
4 STEERING COLUMN
5 GEARBOX
6 TILT BRACKET
7 FASTENING MECHANISM
8, 8A, 8B FIXING MEMBER
31 UPPER SHAFT
32 LOWER SHAFT
41 UPPER COLUMN
42 LOWER COLUMN
42a END PORTION
50 MOTOR
51 PLATE
52 MAIN BODY PORTION
53 LEG PORTION
54 BOLT
61 TILT SPRING
62 PIVOT BRACKET
70 VEHICLE BODY MEMBER
71 OPERATION LEVER
72 FASTENING SHAFT
81 TUBULAR PORTION
82 DISC PORTION
83 FLANGE
100 RIB
110 ANNULAR RIB
120, 130, 140 FIRST RIB
150, 160, 170 SECOND RIB
180 ANNULAR RIB
200 REINFORCING RIB
201, 202 END
210 UPPER SURFACE
300 SWING CENTRAL AXIS
400 CENTRAL AXIS
410 PROTRUDING PORTION
411 FIRST PLATE PORTION
412 SECOND PLATE PORTION
413 COUPLING PLATE
414 RECESSED PORTION
415H THROUGH-HOLE
811 SMALL-DIAMETER PORTION
812 INCLINED PORTION
813 LARGE-DIAMETER PORTION
814 END
821 END
822 INCLINED SURFACE
823 END
824 CYLINDRICAL SURFACE
825 ORTHOGONAL SURFACE
826 CYLINDRICAL SURFACE
831, 832, 833 PROTRUSION
831H, 832H, 833H THROUGH-HOLE
Ax CENTRAL AXIS

The invention claimed is:

1. A steering device comprising:
a steering shaft which extends along a central axis and to which a steering wheel is coupled on one side in an axial direction;
a tubular steering column which is disposed on an outer circumferential side of the steering shaft and extends in the axial direction; and
a gearbox which is disposed on an other side in an axial direction of the steering column and is fixed to the steering column, wherein
the steering column includes:
a fixing member provided at an end on the other side of the steering column in the axial direction and fixed to the gearbox, and an outer circumferential surface on one side in an axial direction of the fixing member has an outer diameter which increases toward an other side of the fixing member in the axial direction,
the fixing member comprises a flange to be attached to the gearbox, and
on a radially inner side of the flange and on the other side in the axial direction of the fixing member, a first rib which extends radially outward from the central axis is provided.

2. The steering device according to claim 1, wherein the outer circumferential surface on the one side in the axial direction of the fixing member is a straight line extending obliquely toward the other side of the fixing member in the axial direction in a cross section including the central axis.

3. The steering device according to claim 1, wherein on a radially inner side of the flange and on the other side in the axial direction of the fixing member, a second rib which intersects the first rib is provided.

4. A steering device comprising:
a steering shaft which extends along a central axis and to which a steering wheel is coupled on one side in an axial direction;
a tubular steering column which is disposed on an outer circumferential side of the steering shaft and extends in an axial direction; and a gearbox which is disposed on an other side in an axial direction of the steering column and is fixed to the steering column, wherein the steering column includes a fixing member provided at an end on the other side of the steering column in the axial direction and fixed to the gearbox, and an outer circumferential surface on one side in an axial direction of the fixing member has an outer diameter which increases toward an other side of the fixing member in the axial direction, wherein the steering column includes:

an upper column;

a lower column disposed on an other side in an axial direction of the upper column, a portion of the lower column being fitted to the upper column; and the fixing member provided on an other side in an axial direction of the lower column, the fixing member has a reinforcing rib which protrudes from the outer circumferential surface on the one side in the axial direction of the fixing member toward the other side of the upper column in the axial direction and an outer side of the fixing member in a radial direction, and at an end portion on the other side in the axial direction of the upper column, a protruding portion in which the reinforcing rib can be accommodated is provided.

* * * * *